United States Patent
Harris et al.

(10) Patent No.: US 7,082,042 B2
(45) Date of Patent: Jul. 25, 2006

(54) SYSTEM AND METHOD FOR POWER DISTRIBUTION

(75) Inventors: Shaun L. Harris, McKinney, TX (US); Gary Williams, Rowlett, TX (US); Rico Brooks, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 10/737,045

(22) Filed: Dec. 16, 2003

(65) Prior Publication Data
US 2005/0127884 A1    Jun. 16, 2005

(51) Int. Cl.
*H02M 7/00* (2006.01)
*H02J 1/00* (2006.01)

(52) U.S. Cl. .......................................... 363/65; 307/82
(58) Field of Classification Search ................. 363/65, 363/71; 323/268, 269, 271, 272, 282, 285; 307/52–54, 60, 69, 58, 82
See application file for complete search history.

(56) References Cited

U.S. PATENT DOCUMENTS

| | | | | |
|---|---|---|---|---|
| 5,835,321 A | * | 11/1998 | Elms et al. | 361/45 |
| 6,154,381 A | * | 11/2000 | Kajouke et al. | 363/65 |
| 6,281,602 B1 | * | 8/2001 | Got et al. | 307/66 |
| 6,574,124 B1 | * | 6/2003 | Lin et al. | 363/65 |
| 6,614,133 B1 | | 9/2003 | Belson et al. | |
| 2002/0080544 A1 | * | 6/2002 | Pellegrino | 361/93.9 |

\* cited by examiner

*Primary Examiner*—Matthew V. Nguyen

(57) ABSTRACT

In another embodiment, the present invention is directed to a power distribution system for electronic equipment, comprising a voltage bus; a plurality of power supplies coupled in parallel to the voltage bus; a plurality of diodes wherein each of the diodes is disposed between a power supply and the voltage bus to isolate the voltage bus from a low power supply voltage; a plurality of sense lines, wherein each of the sense lines is coupled to one of the plurality of power supplies; and a plurality of resistive elements, wherein each of the resistive elements is coupled to the voltage bus and to a respective sense line of the plurality of sense lines, wherein the plurality of resistive elements maintain, when a minimal load is applied to the voltage bus, the sense lines at a voltage sufficiently lower than a voltage of the voltage bus to cause the plurality of power supplies to prevent the plurality of diodes from being reversed-biased.

20 Claims, 1 Drawing Sheet

SYSTEM AND METHOD FOR POWER DISTRIBUTION

FIELD OF THE INVENTION

The present invention relates generally to power supplies for electronic equipment.

DESCRIPTION OF RELATED ART

Large electronic systems (such as telecommunication systems and relatively large computer server platforms) typically possess relatively high current requirements. In large electronic systems, "brick" converters are frequently employed to meet these requirements. Brick converters refer to printed circuit board devices that perform power distribution functions. Brick converters generally convert an input high voltage supply into a lower voltage supply for power distribution within the electronic equipment at current levels appropriate for the electronic equipment. Brick converters may also provide power isolation, power regulation, filtering, and input protection functionality.

Multiple brick converters can be coupled in parallel to a common node voltage bus. The common node voltage bus distributes power to electronic equipment or portions thereof. Typically, a respective blocking or isolation diode is disposed between each brick converter and the voltage bus. Also, a voltage sense bus is coupled to the common node voltage bus to provide feedback to the brick converters. When feedback indicates that the voltage on the common node voltage bus is high, the respective brick converters respond by reducing their energy output, i.e., reducing their duty cycle. When feedback indicates that the voltage on the common node voltage bus is low, the respective brick converters respond by increasing their energy output. By coupling a plurality of brick converters in this manner, the aggregate power supply may be divided between the respective brick converters.

SUMMARY

In another embodiment, the present invention is directed to a power distribution system for electronic equipment, comprising a voltage bus; a plurality of power supplies coupled in parallel to the voltage bus; a plurality of diodes wherein each of the diodes is disposed between a power supply and the voltage bus to isolate the voltage bus from a low power supply voltage; a plurality of sense lines, wherein each of the sense lines is coupled to one of the plurality of power supplies; and a plurality of resistive elements, wherein each of the resistive elements is coupled to the voltage bus and to a respective sense line of the plurality of sense lines, wherein the plurality of resistive elements maintain, when a minimal load is applied to the voltage bus, the sense lines at a voltage sufficiently lower than a voltage of the voltage bus to cause the plurality of power supplies to prevent the plurality of diodes from being reversed-biased.

In another embodiment, the present invention is directed to a method comprising providing a plurality of power supplies to maintain a voltage on a voltage bus, providing a plurality of blocking diodes with each blocking diode being disposed between a respective power supply of the plurality of power supplies and the voltage bus to isolate the voltage bus from a low output voltage, coupling a plurality of sense lines to the plurality of power supplies to provide feedback to control the plurality of power supplies, and coupling a plurality of resistors with each resistor being disposed between a respective sense line of the plurality of sense lines and the voltage bus, wherein the plurality of resistors maintain the sense lines at a sufficiently low voltage when a low load is applied to the voltage bus to prevent the plurality of blocking diodes from being reversed biased.

In another embodiment, the present invention is directed to a power distribution system for electronic equipment, comprising a bus for supplying current to the electronic equipment, a plurality of brick converters coupled in parallel to the bus with a respective blocking diode between each brick converter and the bus, a plurality of sense lines providing feedback to respective brick converters, and a plurality of resistive elements that are each coupled to the bus and to a respective sense line of the plurality of sense lines, wherein the plurality of resistive elements cause sufficient feedback to be provided to the brick converters, under low load conditions, to prevent output voltages of the plurality of brick converters from falling below a voltage of the bus.

DETAILED DESCRIPTION

Figure 1:
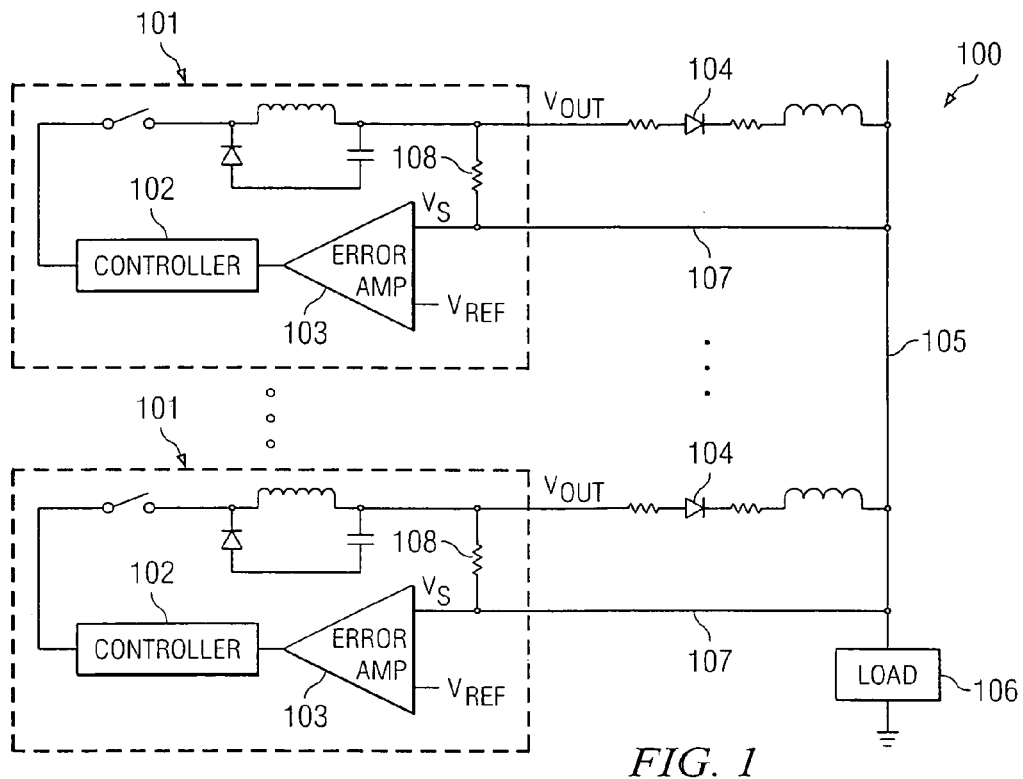
FIG. 1 depicts a system for providing power to electronic equipment.

Referring now to the drawings, FIG. 1 depicts system 100 for providing power to electronic equipment. System 100 includes a plurality of brick converters 101 or other suitable power sources that are coupled in parallel to common node voltage bus 105. Brick converters 101 maintain voltage bus 105 at a relatively fixed voltage when load 106 draws power. Although only two brick converters 101 are shown in FIG. 1, any number could be coupled in parallel. Respective blocking diodes 104 are disposed between each brick converter 101 and voltage bus 105. If one of brick converters 101 malfunctions, the corresponding blocking diode 104 prevents the failing brick converter 101 from pulling down the voltage on voltage bus 105. Protective resistors 108 are used to prevent transients from damaging the electronics associated with load 106.

Voltage sense lines 107 are used to provide feedback to brick converters 101. Specifically, the voltage ($V_S$) of voltage bus 105 is provided to one input of error amplifier 103. A reference voltage ($V_{REF}$) is provided to the other input of error amplifier 103 such as a differential amplifier. The reference voltage defines the voltage at which voltage bus 105 should be maintained, i.e., the voltage rail for the supported electronic equipment. Error amplifier 103 generates an error signal that is indicative of the difference between the voltage on voltage bus 105 and the reference voltage. The error signal is provided to controller 102. During ordinary operations, when the voltage is low, controller 102 increases its duty cycle to provide additional power thereby increasing the voltage on voltage bus 105. Likewise, when the voltage is high, controller 102 reduces the duty cycle thereby reducing the voltage on voltage bus 105.

During ordinary operations (i.e., typical loads), each brick converter 101 provides current to voltage bus 105. Also, the output voltage ($V_{OUT}$) of each brick converter 101 is higher than the voltage on voltage bus 105. However, at apprecia bly lighter loads (approaching zero amps), almost all of the current is provided by only one brick converter 101. The output voltage of the brick converter 101 supplying the current remains higher than the voltage of voltage bus 105. The output voltage of other brick converters 101 are allowed to drop due to the feedback from sense lines 107. Specifically, the other brick converters 101 reduce their duty cycle due to the feedback. Blocking diodes 104 of the other brick converters become reversed biased. The condition causes the other brick converters 101 to be flagged as faulty due to the low output voltage, even though no physical malfunction has occurred.

The removal of blocking diodes 104 would cause the erroneous fault indication to be addressed. However, the removal of blocking diodes 104 is not appropriate for redundant power supply applications. Redundant power supply applications are applications where more brick converters 101 are included within the system than needed for expected power supply requirements. The redundancy of the design ensures that sufficient power can be supplied even if one or several brick converters 101 fail. However, if blocking diodes 104 are removed from a redundant design, a single failing brick converter 101 would pull down the voltage on voltage bus 105 thereby defeating the purpose of the redundant design.

Figure 2:
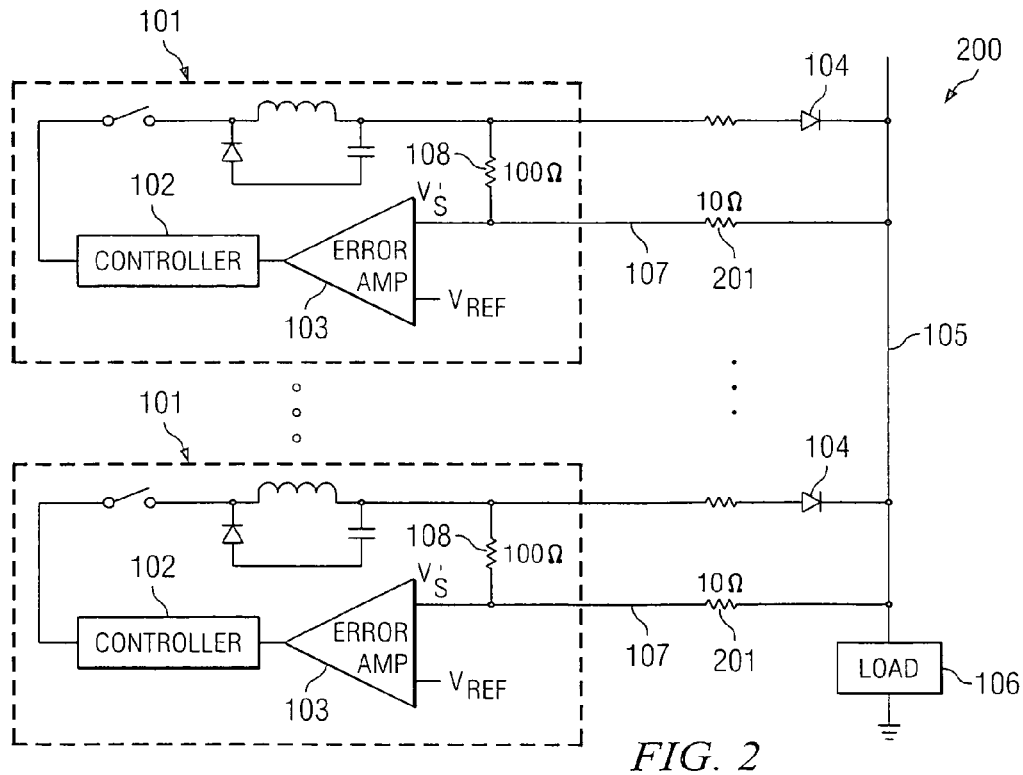
FIG. 2 depicts a power distribution topology according to one representative embodiment.

FIG. 2 depicts power distribution topology 200 according to one representative embodiment. In power distribution topology 200, voltage bus 105 distributes power to load 106. A plurality of brick converters 101 or other suitable power supply units provide current to voltage bus 105 to maintain voltage 105 at a desired voltage. Blocking diodes 104 are disposed between brick converters 101 and voltage bus 105 to prevent a failing brick converter 101 from pulling down the voltage on voltage bus 105.

Sense line 107 provides feedback to brick converter 101. Specifically, the voltage ($V'_S$) on sense line 107 is provided to error amplifier 103. A reference voltage ($V_{REF}$) is provided to the other input of error amplifier 103. Error amplifier 103 generates an error signal that is indicative of the difference between the two voltages. In response to the error signal, controller 102 alters the duty cycle of brick converter 101.

Resistor 201 is disposed between voltage bus 105 and error amplifier 105. Resistor 201 may possess a relatively small amount of resistance as compared to protective resistor 108 (e.g., one order of magnitude less). Resistor 201 enables the voltage on voltage sense line 107 to be slightly different than the voltage on voltage bus 105. The difference is not sufficiently great to appreciably affect the operation of brick converters 101 in response to feedback at ordinary loads. Specifically, at ordinary loads, when the voltage at voltage bus 105 is lower than the reference voltage, controllers 102 increase the duty cycle to increase the voltage on voltage bus 105. Likewise, at ordinary loads, when the voltage at voltage bus 105 is greater than the reference voltage, controllers 102 decrease their duty cycle to decrease the voltage on voltage bus 105.

However, at appreciably lower loads (when the aggregate current approaches zero amps), almost all of the current is supplied by a single brick converter 101. Because of the presence of resistors 201, the voltage ($V'_S$) of sense line 107 for the other brick converters 101 drops. The effect on sense line 107 and response of controller 102 enables the output voltage of the other brick converters 101 to be maintained at levels that avoid an indication of a faulty voltage level and prevent reverse-biasing of block diodes 104.

What is claimed is:

1. A power distribution system for electronic equipment, comprising:
   a voltage bus;
   a plurality of power supplies coupled in parallel to said voltage bus;
   a plurality of diodes wherein each of said diodes is disposed between a power supply and said voltage bus to isolate said voltage bus from a low power supply voltage;
   a plurality of sense lines, wherein each of said sense lines is coupled to one of said plurality of power supplies; and
   a plurality of resistive elements, wherein each of said resistive elements is coupled to said voltage bus and to a respective sense line of said plurality of sense lines, wherein said plurality of resistive elements maintain, when a minimal load is applied to said voltage bus, said sense lines at a voltage sufficiently lower than a voltage of said voltage bus to cause said plurality of power supplies to prevent said plurality of diodes from being reversed-biased.

2. The power distribution system of claim 1, wherein each of said plurality of power supplies comprises a controller for increasing or decreasing a duty cycle in response to feedback associated with a respective sense line of said plurality of sense lines.

3. The power distribution system of claim 2 wherein each power supply of said plurality of power supplies comprises an error amplifier coupled between a respective sense line of said plurality of sense lines and said controller.

4. The power distribution system of claim 1 wherein said plurality of power supplies are brick converters.

5. The power distribution system of claim 1 further comprising:
   a plurality of protective resistors each coupled between a respective output of one of said plurality of power supplies and a respective sense line of said plurality of sense lines.

6. The power distribution system of claim 5 wherein each of said plurality of resistors possesses a resistance that is one order of magnitude greater than resistance of said plurality of resistive elements.

7. A method comprising:
   providing a plurality of power supplies to maintain a voltage on a voltage bus;
   providing a plurality of blocking diodes with each blocking diode being disposed between a respective power supply of said plurality of power supplies and said voltage bus to isolate said voltage bus from a low output voltage;
   coupling a plurality of sense lines to said plurality of power supplies to provide feedback to control said plurality of power supplies; and
   coupling a plurality of resistors with each resistor being disposed between a respective sense line of said plurality of sense lines and said voltage bus, wherein said plurality of resistors maintain said sense lines at a sufficiently low voltage when a low load is applied to said voltage bus to prevent said plurality of blocking diodes from being reversed biased.

8. The method of claim 7 further comprising:
   increasing a duty cycle of one of said plurality of power supplies when a voltage on a respective sense line falls below a reference voltage.

9. The method of claim 7 further comprising:
decreasing a duty cycle of one of said plurality of power supplies when a voltage on a respective sense line exceeds a reference voltage.

10. The method of claim 7 further comprising:
operating a respective differential amplifier for each of said power supplies with a first input coupled to a respective sense line and with a second input coupled to a reference voltage.

11. The method of claim 7 wherein said plurality of power supplies are brick converters.

12. The method of claim 7 further comprising:
providing a second plurality of resistors with each resistor of said second plurality of resistors being coupled between a respective power supply and a respective sense line.

13. The method of claim 12 wherein each resistor of said plurality of resistors possesses a resistance that is approximately $1/10^{th}$ of a resistance of said second plurality of resistors.

14. A power distribution system for electronic equipment, comprising:
a bus for supplying current to said electronic equipment;
a plurality of brick converters coupled in parallel to said bus with a respective blocking diode between each brick converter and said bus;
a plurality of sense lines providing feedback to respective brick converters; and
a plurality of resistive elements that are each coupled to said bus and to a respective sense line of said plurality of sense lines, wherein said plurality of resistive elements cause sufficient feedback to be provided to said brick converters, under low load conditions, to prevent output voltages of said plurality of brick converters from falling below a voltage of said bus.

15. The power distribution system of claim 14, wherein each of said plurality of brick converters increases or decreases a duty cycle in response to said feedback.

16. The power distribution system of claim 15 wherein each brick converter of said plurality of brick converters comprises a differential amplifier coupled to a respective sense line and a reference voltage.

17. The power distribution system of claim 16 wherein each brick converter of said plurality of brick converters comprises a controller for processing an error signal from a respective differential amplifier.

18. The power distribution system of claim 16 wherein said reference voltage defines a voltage rail for said electronic equipment.

19. The power distribution system of claim 14 further comprising:
a plurality of protective resistors each coupled between a respective output of one of said plurality of brick converters and a respective sense line.

20. The power distribution system of claim 19 wherein each of said plurality of resistors possesses a resistance that is one order of magnitude greater than resistance of said plurality of resistive elements.

* * * * *